United States Patent [19]
Quirk

[11] 3,857,546
[45] Dec. 31, 1974

[54] BALL VALVE WITH FILAMENT WOUND BODY

[75] Inventor: Robert W. Quirk, Los Angeles, Calif.

[73] Assignee: Valve Systems International, Inc., Chatsworth, Calif.

[22] Filed: July 23, 1971

[21] Appl. No.: 165,622

[52] U.S. Cl............. 251/315, 251/368, 137/375
[51] Int. Cl......................... F16k 27/06, F16k 5/06
[58] Field of Search............ 251/315, 368; 137/375

[56] References Cited
UNITED STATES PATENTS

| | | | |
|---|---|---|---|
| 3,118,649 | 1/1964 | Allen et al. | 251/315 X |
| 3,122,352 | 2/1964 | Anderson et al. | 251/315 X |
| 3,227,174 | 1/1966 | Yost | 251/368 X |
| 3,458,172 | 7/1969 | Burrows | 251/315 X |
| 3,494,590 | 2/1970 | Enssle | 251/315 |
| 3,501,128 | 3/1970 | Pool | 251/315 X |
| 3,503,415 | 3/1970 | Angelis et al. | 251/315 X |
| 3,503,416 | 3/1970 | Clarkson | 137/375 |
| 3,508,573 | 4/1970 | Smith | 137/375 |
| 3,516,638 | 6/1970 | Piggott | 251/315 X |
| 3,521,858 | 7/1970 | Albro | 251/315 |
| 3,552,426 | 1/1971 | Hester et al. | 137/375 |
| 3,591,137 | 7/1971 | Billeter | 251/315 |

*Primary Examiner*—William R. Cline
*Attorney, Agent, or Firm*—Harris, Kern, Wallen & Tinsley

[57] ABSTRACT

A ball-type valve wherein the ball and its actuating stem, and the ball and stem seals, are enclosed by a valve body formed by winding a resin-impregnated filament around the ball, stem and seals and around a mandrel carrying the ball. The windings are preferably roving and/or tape of fiber glass. A suitable parting agent is used to prevent bonding of the valve body to the ball and stem, and to the seals if necessary. Preferably, the parting agent is a membrane which also serves to prevent weeping of the fluid flowing through the valve in use. Such a membrane may be a heat shrinkable thermoplastic shrunk onto the ball, stem and seals, such a membrane serving not only as a parting agent and as a weep barrier, but also as a means for holding the seals in place.

3 Claims, 9 Drawing Figures

INVENTOR.
ROBERT W. QUIRK
BY HIS ATTORNEYS.
HARRIS, KIECH, RUSSELL & KERN

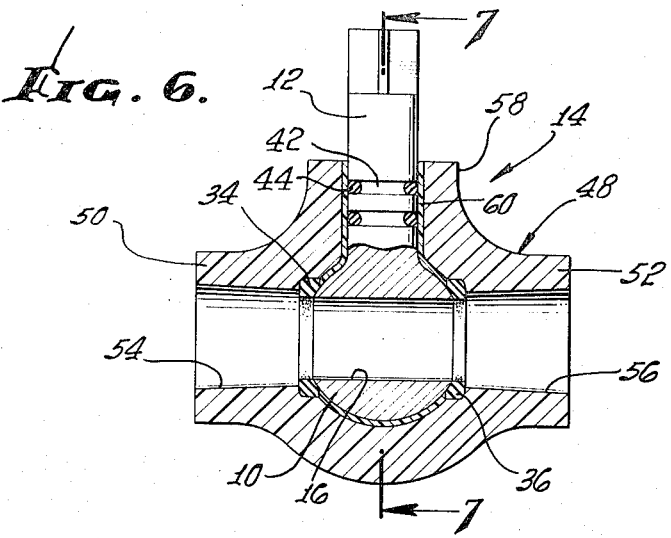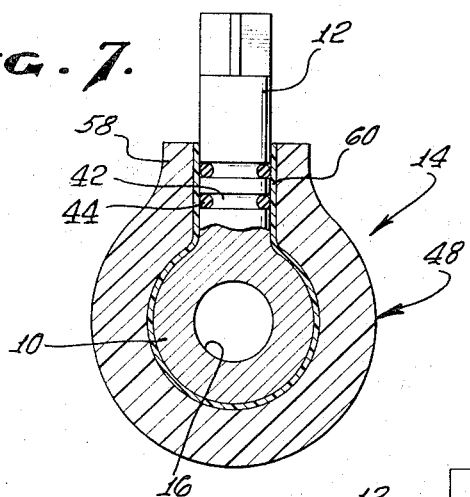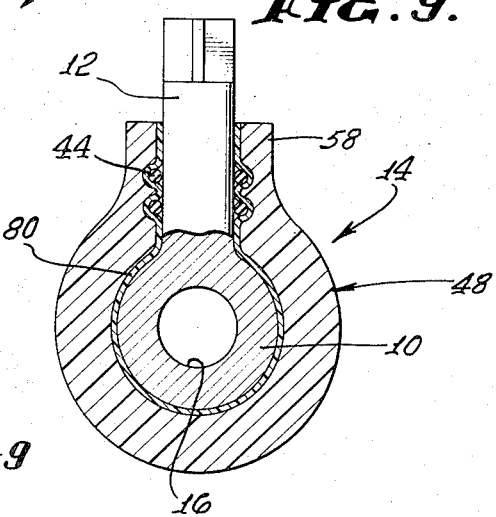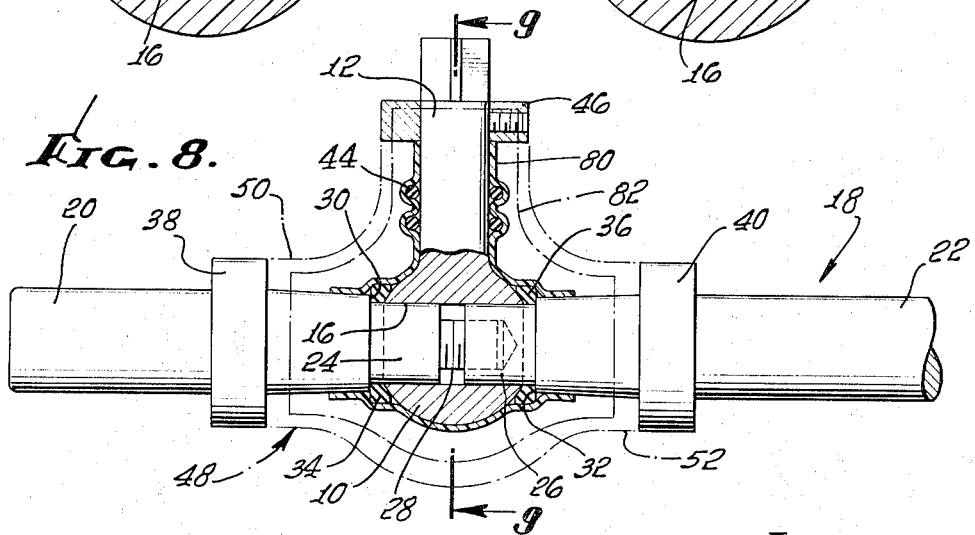

BALL VALVE WITH FILAMENT WOUND BODY

BACKGROUND OF INVENTION

The present invention relates in general to valves and, more particularly, to a valve having a rotatable valve member and actuating stem encased in a valve body of resin-impregnated reinforcing material, such as fiber glass. It is conventional to make a valve of this type by molding the valve body around the valve element and its stem, and around the seals for the valve element and the stem. Such a valve is disclosed in U.S. Pat. No. 3,271,845, issued Sept. 13, 1966 to Rudolf Breher.

CROSS REFERENCE TO RELATED APPLICATION

Incorporated herein by reference is my co-pending patent application Ser. No. 108,321, filed Jan. 21, 1971, now abandoned which discloses a winding apparatus suitable for making the valve body of the present invention.

SUMMARY AND OBJECTS OF INVENTION

The primary object of the present invention is to provide a valve of the foregoing general nature wherein the valve body is formed by winding resin-impregnated filamentary material around the valve element and its stem, and around the seals for the valve element and stem. The filamentary material preferably comprises roving and/or woven tape of fiber glass, although other windable reinforcing materials may be used.

Utilizing a filament wound valve body, as opposed to a molded valve body, has important advantages, such as much higher strength, the lack of any necessity for making molds, and the like.

Another important object of the invention is to form the valve body by winding resin-impregnated filamentary material around the valve element and its stem, and around their seals, while supporting these parts on a mandrel extending into the passage through the valve element, the resin-impregnated filamentary material also being wound around the mandrel on opposite sides of the valve element to form end portions of the valve body. A related object is to incorporate more of the resin-impregnated filamentary material in the valve body at the junctions of the end and neck portions thereof to increase the thickness of the valve body in these regions for added strength, the neck portion, of course, enclosing the actuating stem of the valve element.

Other objects are to wind the valve body generally circumferentially throughout its end and neck portions, and at acute angles to the end and neck portions in the regions of the junctions thereof.

Another important object of the invention is to prevent bonding of the valve body to the valve element and stem by covering the latter with a parting agent. Such parting agent may also cover the seals for the valve element and the stem if these seals are of materials which would bond to the valve body.

Yet another important object is to encase the valve element, its stem, and their seals, in a membrane which acts as a parting agent. A related object of importance is to provide such a membrane which also acts as a weep barrier, preventing leakage of fluid during operation of the valve, and which further serves to secure the seals for the valve element and its stem in place during the winding operation. Yet another related object is to provide such a membrane which is shrunk onto the valve element, its stem, and their seals. Preferably, the membrane is formed of a heat shrinkable thermoplastic which is corrosion resistant, in addition to having the other properties mentioned.

After the filament wound valve body has been formed in the foregoing manner, the entire valve, still mounted on the mandrel, may be cured in any conventional manner. For example, it may be cured in an oven if the resin impregnating the filamentary winding material is of the thermosetting type. Subsequently, the mandrel is removed and the valve body may be subjected to any desired finishing operations.

The foregoing objects, advantages, features and results of the present invention, together with various other objects, advantages, features and results thereof which will be evident to those skilled in the valve art in the light of this disclosure, may be achieved with the exemplary embodiments of the invention described in detail hereinafter and illustrated in the accompanying drawings.

DESCRIPTION OF DRAWINGS

In the drawings:

FIG. 6 is a longitudinal sectional view through the finished ball valve;

FIG. 7 is a transverse sectional view taken as indicated by the arrowed line 7—7 of FIG. 6;

FIG. 8 is a view similar to FIG. 1, but illustrating another embodiment of the invention; and FIG. 9 is a transverse sectional view taken as indicated by the arrowed line 9-9 of FIG. 8 and showing a finished ball valve.

DETAILED DESCRIPTION OF EXEMPLARY EMBODIMENTS OF INVENTION

Figure 1:
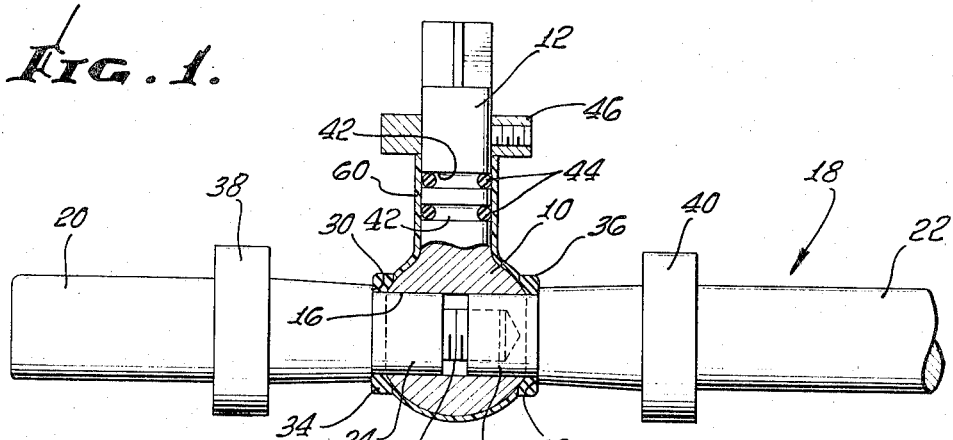
FIG. 1 is a side elevational view, partially in longitudinal section, of a ball and stem of a ball valve mounted on a mandrel preparatory to winding with a resin-impregnated filamentary material.

Referring initially to FIG. 1 of the drawings, illustrated therein are a ball 10 and an actuating stem 12 which are to be embodied in a ball valve 14, FIG. 6, in accordance with the invention. The ball 10 is provided with the usual flow passage 16 therethrough, which passage is shown as straight in the particular embodiment illustrated. The ball 10 and the stem 12 may be made of any suitable material. For example, they may be made of a suitable synthetic resin, such as epoxy, polyester, or the like, reinforced with any suitable material, such as fiber glass. With such a construction, the ball 10 and stem 12 are corrosion resistant.

The ball 10 and its stem 12 are mounted on a mandrel 18 formed in two sections 20 and 22 having ends 24 and 26 plugged into the corresponding ends of the passage 16 and suitably interconnected, as by a threaded connection 28. The mandrel sections 20 and 22 are provided with annular shoulders 30 and 32 for holding annular ball seals 34 and 36 aginst the ball 10 around the ports at the corresponding ends of the passage 16. The mandrel sections 20 and 22 are also provided with annular flanges 38 and 40 spaced from the respective shoulders 30 and 32. As will become apparent, the flanges 38 and 40 act as stops for limiting the extent of winding of the mandrel sections with resin-impregnated filamentary material.

The stem 12 is provided therein with annular grooves 42 containing O-ring seals 44. Suitably secured to the stem 12 outwardly of the O-rings 44 is an annular flange 46 which serves the same function as the flanges 38 and 40 on the mandrel sections 20 and 22.

Turning for the moment to FIGS. 6 and 7, the finished ball valve 14 includes a valve body 48 formed of resin-impregnated filamentary material, preferably fiber glass roving and/or woven tape. Various resins may be used to impregnate the fiber glass windings, such as epoxy, polyester, or the like. The valve body 48 includes end portions 50 and 52 respectively provided by the mandrel sections 20 and 22 with passages 54 and 56 with which the passage 16 through the ball 10 registers when the ball is rotated into the proper position by its stem 12. The valve body 48 also includes a neck portion 58 which surrounds the portion of the stem 12 adjacent the ball 10, including the portion of the stem carrying the O-rings 44. It will be noted that the valve body 48 has increased thickness at the junctions of the end and neck portions 50, 52 and 58, providing added strength in these regions.

To prevent bonding of the resin-impreganted filamentary material to be wound around the ball 10, stem 12, seals 34, 36 and 44, and the mandrel sections 20 and 22 inwardly of the flanges 38 and 40, a parting layer 60 is applied to any elements to which bonding would occur. In the particular construction illustrated, the parting layer 60 is shown as covering the exposed portion of the ball 10 and the portion of the stem 12 outwardly to the flange 46 thereon. The ball seals 34 and 36 are shown as exposed, which is satisfactory if they are made of a material, such as Teflon, to which resins of the type hereinbefore mentioned will not bond. Since the O-rings 44 are shown as covered by the parting layer 60, they may be formed of a material which otherwise would bond to such resins as epoxy, polyester, or the like.

The parting layer 60 may be formed of any suitable material which will not bond to the resins to be used in winding the valve body 48, and it may be applied in any suitable way. For example, the parting layer 60 may be formed by winding Teflon tape around the exposed portion of the ball 10 and the portion of the stem 12 inwardly of the flange 46. Also, the parting layer 60 may be formed by spraying or dipping with a suitable parting agent. If the parting layer 60 is applied as a solid membrane, it also serves as a weep barrier when the valve 14 is in use.

Turning now to FIGS. 2 to 5 of the drawings, the assembly shown in FIG. 1 is wound with resin-impregnated filamentary material to form the valve body 48. To accomplish this, the winding machine disclosed in my aforementioned co-pending application may be used. Since this machine is fully illustrated and described in my co-pending application, it will be described only briefly herein in connection with FIGS. 2 to 5.

The winding machine comprises a rotary assembly 64 which is rotatable about a vertical axis in either direction relative to the mandrel 18, as indicated by the double headed arrow 66. The rotary assembly 64 is also movable upwardly and downwardly relative to the mandrel 18, as indicated by the double-headed arrows 68. The rotary assembly 64 includes two guides 70 which feed resin-impregnated filaments 72 of fiber glass roving and/or woven tape to the mandrel 18, as more fully disclosed in my co-pending application.

The mandrel 18 may be positioned relative to the rotary assembly 64 with various orientations. For example, in FIG. 2, the mandrel 18 is positioned horizontally with the axis of the neck portion 58 of the valve body on the axis of rotation of the rotary assembly 64. With this orientation of the mandrel 18, resin-impregnated filamentary material may be wound around the stem 12 to form the neck portion 58 of the valve body 48.

The mandrel 18 may also be oriented vertically with its axis on the axis of rotation of the rotary assembly 64. By rotating the rotary assembly and moving it upwardly and downwardly, and, if desired, by simultaneously rotating the mandrel 18, as indicated by the double-headed arrow 74, the end portions 50 and 52 of the valve body 48 may be formed, limited by the flanges 38 and 40 on the mandrel 18.

Figure 4:
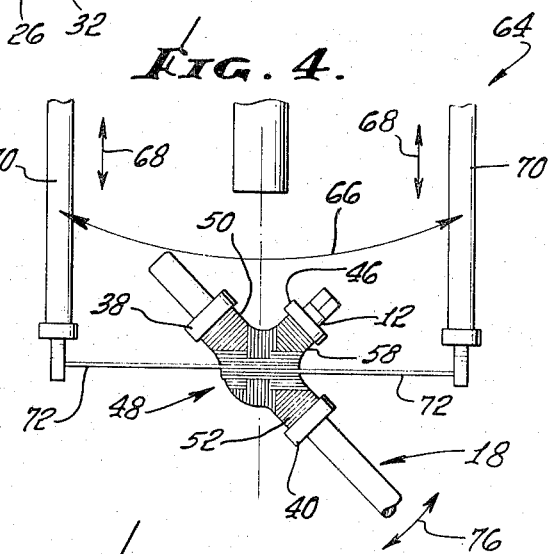
Figure 5:
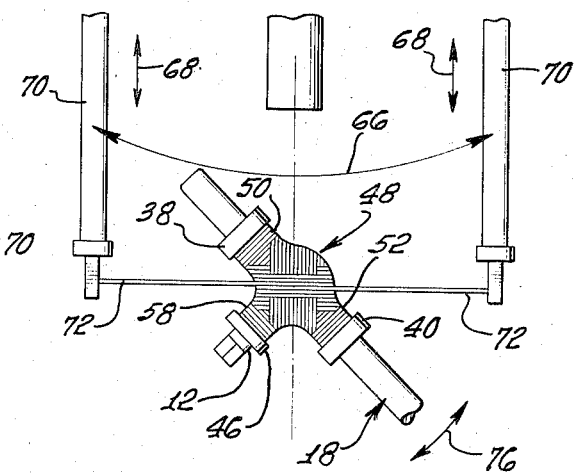

As shown in FIGS. 4 and 5, the mandrel 18 may be positioned at variable acute angles to the axis of rotation of the rotary assembly 64, as indicated by the double-headed arrows 76. In FIG. 4, the stem 12 is shown facing in one direction, and in FIG. 5, the stem is shown facing in the opposite direction. In both FIGS. 4 and 5, by rotating the rotary assembly 64 and moving it upwardly and downwardly, windings of the resin-impregnated filamentary material 72 may be applied at acute angles to the end portions 50 and 52 of the valve body 48 and to the neck portion 58 thereof.

Figure 2:
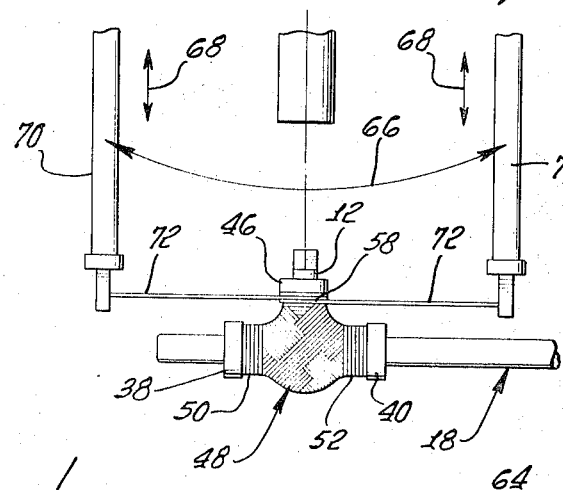
FIGS. 2, 3, 4 and 5 are semidiagrammatic views illustrating steps in the winding operation.
Figure 3:
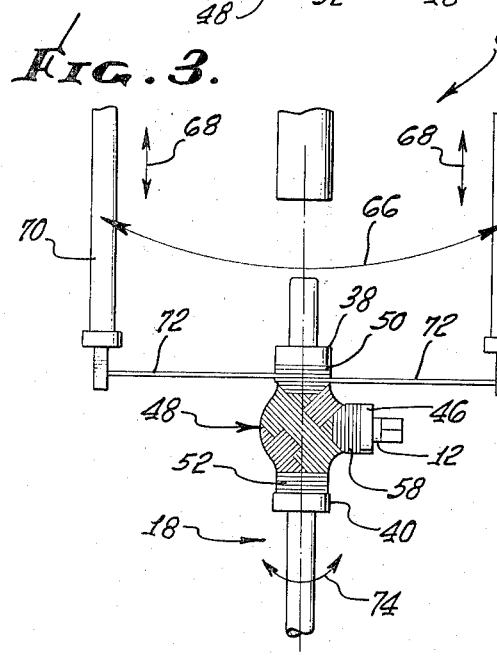

As will be apparent, by repeatedly applying layers of substantially circumferential, helical windings to the end and neck portions 50, 52 and 58, as shown in FIGS. 2 and 3, and layers of diagonal windings as shown in FIGS. 4 and 5, the assembly of FIG. 1 is completely covered with layers of windings of the resin-impregnated filamentary material 72, out to the flanges 38, 40 and 46, to build up the valve body 48. After the valve body has been completed in this fashion, it can be cured on the mandrel 18, the mandrel and the flange 46 subsequently being removed to provide the finished ball valve 14, shown in FIGS. 6 and 7 of the drawings.

In the construction illustrated in FIGS. 8 and 9 of the drawings, the ball 10, the stem 12 out to the flange 46, the O-rings 44, the ball seals 34 and 36, and portions of the mandrel sections 20 and 22 inwardly of the flanges 38 and 40, are all encapsulated in a membrane 80 of a material which acts as a parting or release agent against bonding to the filament wound valve body 48, which acts as a weep barrier when the ball valve 14 is in use, and which also has excellent corrosion resistance. (With the latter in mind, the membrane 80 can be extended all the way to the extremities of the end portions 50 and 52 of the valve body 48, if desired.) Preferably, the membrane 80 is shrunk onto the parts mentioned, and, desirably, such shrinking of the membrane is accomplished by utilizing a suitable heat shrinkable thermoplastic material, such as Teflon. By placing a Teflon enclosure of suitable shape and size around the parts mentioned, as suggested by the broken line 82, and by then heating this envelope, it will be caused to shrink to form the encapsulating membrane 80. This membrane also serves to hold the various seals in place. Consequently, with this construction, it is not necessary to dispose the O-rings 44 in grooves in the valve stem 12.

After the membrane 80 is applied in the manner indicated, the valve body 48 is formed in the same manner as hereinbefore discribed.

If desired, the reinforcing windings may be supplemented with woven fabric reinforcement, particularly in the neck area 58. For example, after the valve body 48 is about half wound, a resin-impregnated woven fabric blanket can be placed over the entire body, or the neck area 58 only, and the winding operations then completed.

Although exemplary embodiments of the invention have been disclosed herein for purposes of illustration, it will be understood that various changes, modifications and substitutions may be incorporated in such embodiments without departing from the spirit of the invention as defined by the claims appearing hereinafter.

I claim as my invention:

1. A ball-type valve comprising a valve body having a flow passage extending therethrough and having a laterally extending neck portion, a generally spherical ball having a flow passage extending therethrough and terminating in ports at the circumference of the ball, a stem connected to said ball and having a constant-diameter portion projecting laterally of said valve body through said neck portion thereof, a pair of annular ball seals embedded in said valve body in contact with said ball and surrounding the interior junctions of the flow passage of said valve body with said ball, an annular stem seal embedded in said neck portion of said valve body and encircling said stem, said valve body, including said neck portion thereof, comprising a plurality of layers of a resin-impregnated filament wound around said ball and around said ball and stem seals, and a membrane enclosing said ball, said stem, and said ball and stem seals, and over which filament is wound.

2. A ball-type valve comprising a valve body having a flow passage extending therethrough, a generally spherical ball having a flow passage extending therethrough and terminating in ports at the circumference of the ball, a stem connected to said ball and projecting laterally of said valve body, a pair of annular ball seals mounted within said valve body in contact with said ball and surrounding the interior junctions of the flow passage of said valve body with said ball, said valve body comprising a plurality of layers of a resin-impregnated filament wound around said ball and said seals and around the junction of said stem with said ball, and a membrane which is located between said valve body and said ball and over which said filament is wound, said membrane being shrunk onto said ball, said stem and said ball seals.

3. A ball-type valve according to claim 2 wherein said membrane is a heat shrunk thermoplastic.

* * * * *